United States Patent
Arai

(10) Patent No.: US 8,878,554 B2
(45) Date of Patent: Nov. 4, 2014

(54) METHOD OF TESTING FITTED STATE OF PIEZOELECTRIC ELEMENT AND HEAD SUSPENSION

(75) Inventor: Mikio Arai, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 437 days.

(21) Appl. No.: 13/271,837

(22) Filed: Oct. 12, 2011

(65) Prior Publication Data

US 2012/0127614 A1    May 24, 2012

(30) Foreign Application Priority Data

Nov. 24, 2010  (JP) .................................. 2010-261577

(51) Int. Cl.
  *G01R 27/26*   (2006.01)
  *G11B 5/48*    (2006.01)
(52) U.S. Cl.
  CPC .................................. *G11B 5/4873* (2013.01)
  USPC ......................................................... 324/662
(58) Field of Classification Search
  CPC .. G11B 5/4873; G11B 5/4833; G01L 9/0022; G01L 9/008; G01D 5/2417
  See application file for complete search history.

(56) References Cited

U.S. PATENT DOCUMENTS

| | | | | |
|---|---|---|---|---|
| 3,341,400 A * | 9/1967 | Grater | ........................... | 162/347 |
| 4,255,768 A * | 3/1981 | Kubota | ......................... | 386/263 |
| 4,734,609 A * | 3/1988 | Jasmine | ....................... | 310/315 |
| 6,204,811 B1* | 3/2001 | Phillips | ......................... | 342/372 |
| 6,327,120 B1* | 12/2001 | Koganezawa et al. | ...... | 360/294.4 |
| 6,340,858 B1* | 1/2002 | Jaenker | ......................... | 310/328 |
| 6,639,411 B1 | 10/2003 | Thomsen | | |
| 7,280,319 B1* | 10/2007 | McNab | ...................... | 360/294.4 |
| 8,233,245 B2* | 7/2012 | Soga et al. | ................. | 360/294.4 |

FOREIGN PATENT DOCUMENTS

| | | |
|---|---|---|
| JP | 2010-086649 | 4/2010 |
| JP | 2010-250917 | 11/2010 |

* cited by examiner

*Primary Examiner* — Paresh Patel
(74) *Attorney, Agent, or Firm* — Jordan and Hamburg LLP

(57) ABSTRACT

A method of testing a fitted state of a pair of piezoelectric elements fitted to form an actuator between a base member and a movable member, the piezoelectric elements in the actuator being arranged side by side in opposite polarity and being electrically connected in parallel with each other, and when a voltage is applied to the piezoelectric elements, minutely moving the movable member relative to the base member in a direction in which the piezoelectric members are arranged side by side. The method detects changes in capacitance of the piezoelectric elements with respect to changes in bias voltage applied to the piezoelectric elements, the bias voltage being changed within a predetermined range, and determines a fitted state of the piezoelectric elements according to a characteristic of the detected capacitance changes. The method correctly and easily determines whether or not the piezoelectric elements are correctly fitted to the actuator.

10 Claims, 14 Drawing Sheets

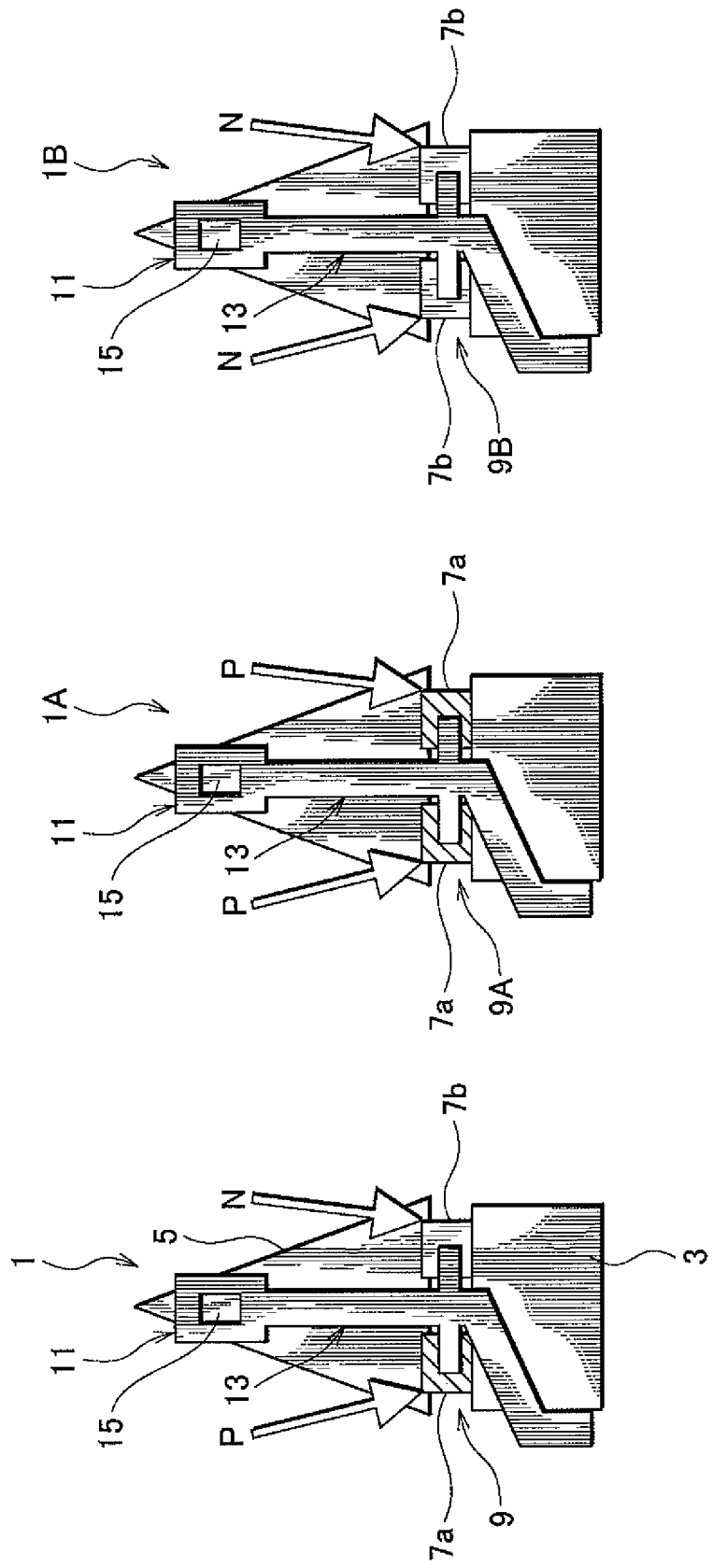

C-V Characteristics

Fig.3B
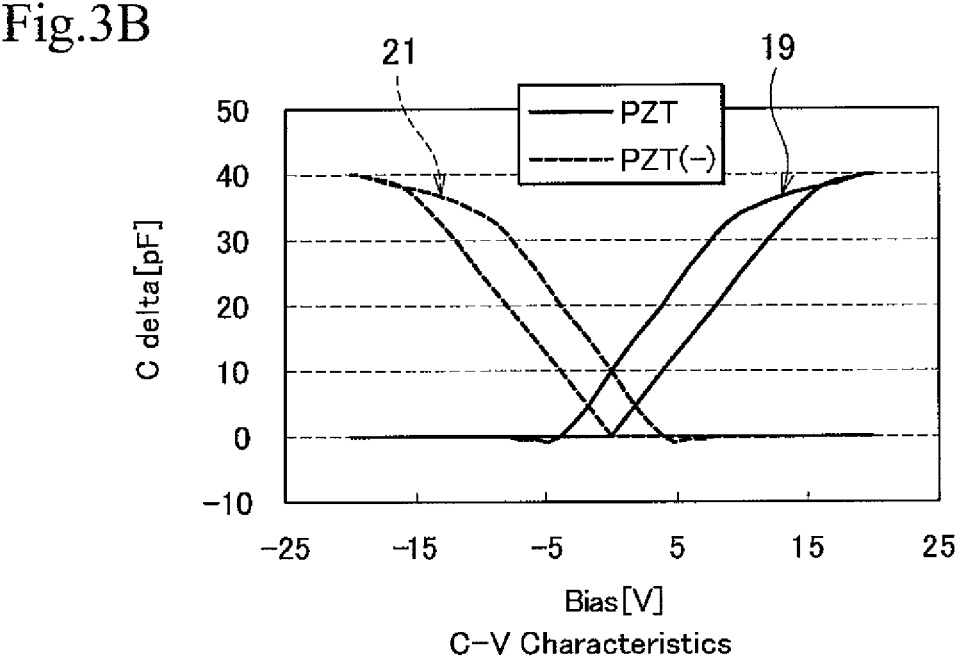
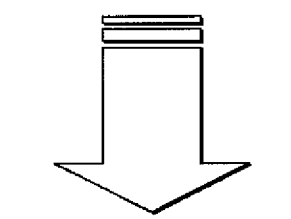
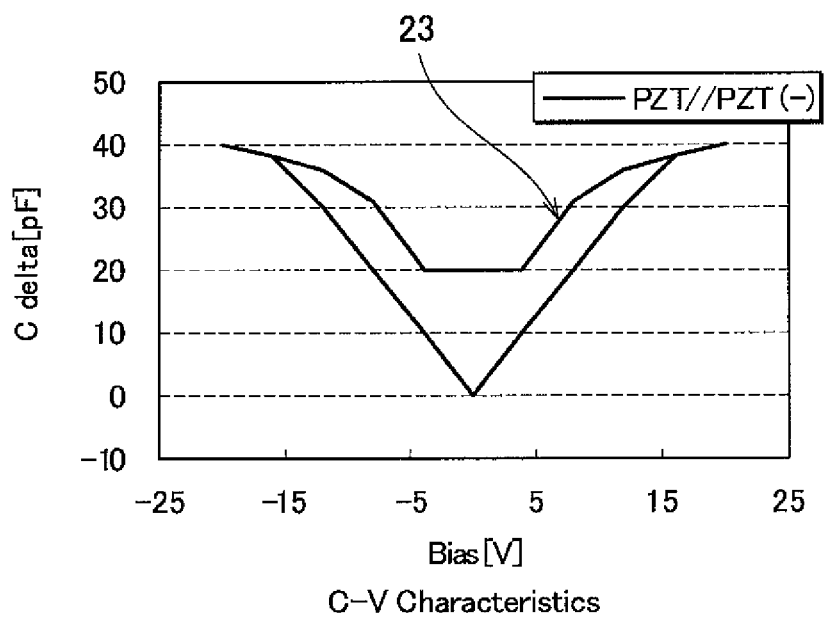

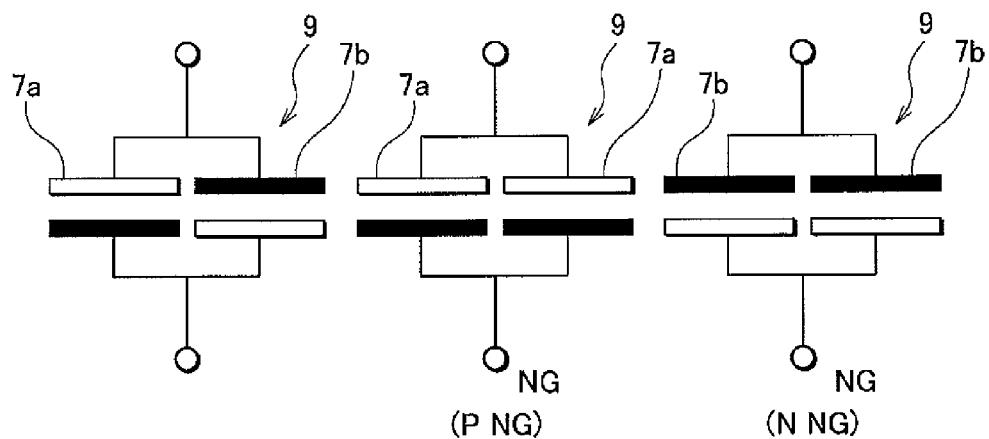
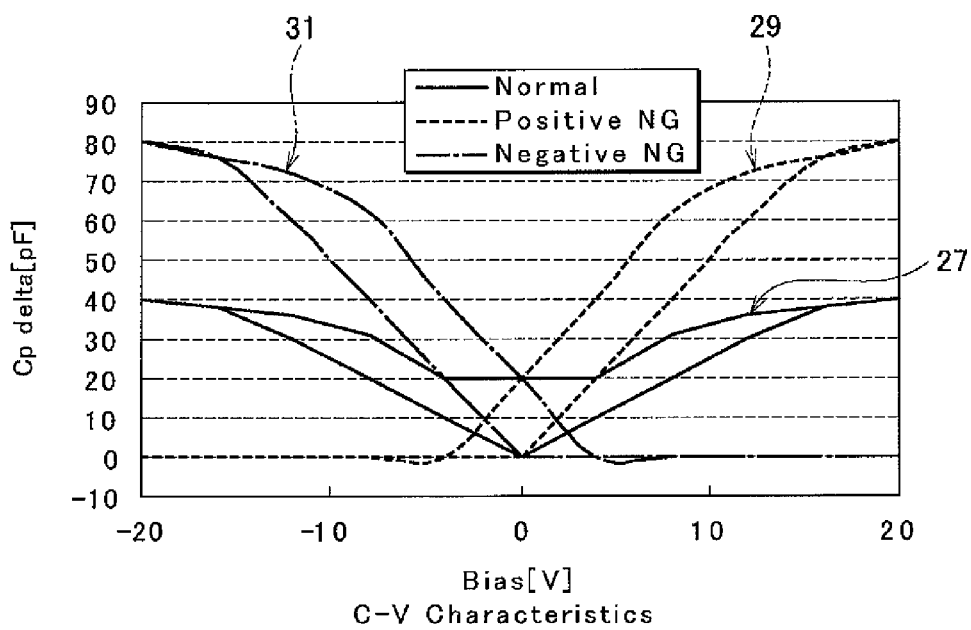

Incorrect fitting determination

|  | V[ V ] | 0[ V ] | -V[ V ] |
|---|---|---|---|
| $\delta C_{OK}$ | (a-b')V | 0 | (a'-b)V |
| $\delta C_{PNG}$ | 2aV | 0 | -2bV |
| $\delta C_{NNG}$ | -2b'V | 0 | 2a'V |

Capacitance Delta Distribution (bias 20V−0V)

Distribution of C with respect to bias voltages of 20 V
and 0 V and threshold values Cth and Ctl obtained from "a" and "b"

Capacitance Delta Distribution (bias 20V−−20V)

Distribution of C with respect to bias voltages of 20 V
and -20 V and threshold values Cth and Ctl obtained from "a" and "b"

Sample#1

Sample#2

Sample#3

Sample#4

1,2(Only P-PZT is sound.)

C-V Characteristics

3,4(Only N-PZT is sound.)

C-V Characteristics

Head suspension installed in HDD

Head suspension supported alone in free state

METHOD OF TESTING FITTED STATE OF PIEZOELECTRIC ELEMENT AND HEAD SUSPENSION

BACKGROUND OF THE INVENTION

1. Field of the Invention

The present invention relates to a method of testing a fitted state of piezoelectric elements used when manufacturing, for example, a head suspension that is a device arranged in a disk drive of an information processing apparatus such as a personal computer. The present invention also relates to a head suspension manufactured through the test of the fitted state of the piezoelectric elements.

2. Description of Related Art

Small-sized, precision information devices are rapidly advancing, and for use with such devices, needs for micro-actuators capable of conducting positioning control for very small distances are increasing. The micro-actuators are highly needed by, for example, optical systems for correcting focuses and inclination angles, ink-jet printers for controlling ink heads, and magnetic disk drives for controlling magnetic heads.

The magnetic disk drives increase storage capacity by increasing the number of tracks per inch (TPI), i.e., by narrowing the width of each track on a magnetic disk.

Large-capacity magnetic disk drives, therefore, need an actuator capable of precisely positioning the magnetic head within a minute range across tracks.

To meet the need, in Japanese Unexamined Patent Application Publication No. 2010-86649, a head suspension employing a dual actuator system is disclosed. The dual actuator system uses a piezoelectric element in addition to a usual voice coil motor that drives a carriage to which the head suspension is attached.

FIG. 23A is a plan view roughly illustrating the head suspension, FIG. 23B is an equivalent circuit of the piezoelectric elements, and FIG. 23C illustrates deformation of the piezoelectric elements.

In FIG. 23A, the head suspension 101 has a base plate 103, a load beam 105, and a pair of piezoelectric elements 107a and 107b. The piezoelectric elements 107a and 107b are arranged in opposite polarity to form an actuator 109. A front end of the load beam 105 supports a read/write head 111. The load beam 105 and head 111 form a movable member.

In FIG. 23B, the piezoelectric elements 107a and 107b deform according to a voltage applied thereto. Namely, depending on the applied voltage, the piezoelectric elements 107a and 107b oppositely deform in expanding and contracting directions as illustrated in FIG. 23C. As a result, the head 111 slightly moves relative to the base plate 103 through the load beam 105 in a sway direction, i.e., a direction in which the piezoelectric elements 107a and 107b are arranged side by side.

To precisely allow such a minute movement of the head 111, the piezoelectric elements 107a and 107b must precisely be fitted to the head suspension 101 as designed.

It is difficult, however, to distinguish the piezoelectric elements 107a and 107b and the top and bottom faces thereof by appearance. Due to this, there is a possibility of erroneously fitting the piezoelectric elements 107a and 107b to the head suspension 101.

To avoid this, there is a technique of providing the piezoelectric element 107a (107b) with a mark so that the piezoelectric elements 107a and 107b are distinguishable by appearance. This technique, however, raises a contamination problem, and therefore, is hardly adoptable.

There is another technique that applies a voltage to the actuator 109, measures an actual stroke of the head 111, and determines whether or not the piezoelectric elements 107a and 107b are correctly fitted to the head suspension 101.

An actual stroke of the head 111 is very small such as 50 to 100 nm, and therefore, is measurable only with a precise measuring device that is very expensive.

There is still another technique disclosed in U.S. Pat. No. 6,639,411. This technique forcibly displaces the head suspension 101, and according to signals obtained at this time, determines orientation of the piezoelectric elements 107a and 107b and whether or not the piezoelectric elements are correctly fitted to the head suspension 101.

FIG. 24A is a view roughly illustrating the head suspension 101 of FIG. 23A installed in a hard disk drive and FIG. 24B is a view illustrating the head suspension 101 supported alone in a free state.

As is apparent from comparison between FIGS. 24A and 24B, the head suspension 101 supported alone differs from the head suspension 101 that is installed in a hard disk drive and receives load on the load beam 105. When the head suspension 101 supported alone receives oscillation for a test, the load beam 105 of the head suspension 101 unstably moves to provide unstable data. With such unstable data, it is unable to correctly determine a fitted state of the piezoelectric elements 107a and 107b of the head suspension 101.

In addition, the related arts mentioned above hardly test a breakage in wiring connected to the actuator 109.

SUMMARY OF THE INVENTION

An object of the present invention is to provide a method of correctly testing a fitted state of piezoelectric elements of an actuator.

In order to accomplish the object, an aspect of the present invention provides a method of testing a fitted state of a pair of piezoelectric elements fitted to form an actuator between a base member and a movable member, the piezoelectric elements being arranged side by side in opposite polarity and being electrically connected in parallel with each other, and when a voltage is applied to the piezoelectric elements, minutely moving the movable member relative to the base member in a direction in which the piezoelectric members are arranged side by side. The method includes a step detecting changes in capacitance of the piezoelectric elements with respect to changes in bias voltage applied to the piezoelectric elements, the bias voltage being changed within a predetermined range, and a step determining a fitted state of the piezoelectric elements according to a characteristic of the detected capacitance changes.

This aspect of the present invention correctly and easily determines whether or not the piezoelectric elements are correctly fitted to form the actuator according to a characteristic of the detected capacitance changes.

BRIEF DESCRIPTION OF THE DRAWINGS

FIGS. 1A to 1C are plan views illustrating a head suspension and piezoelectric elements fitted thereto, in which FIG. 1A illustrates a normal product, FIG. 1B illustrates a waster (P-NG waster) with a positive electrode of each piezoelectric element being on top, and FIG. 1C illustrates a waster (N-NG waster) with a negative electrode of each piezoelectric element being on top;

FIG. 3B is a graph illustrating capacitance-voltage characteristics of the piezoelectric elements of FIG. 3A with an initial state being zeroed and a graph illustrating a combined capacitance-voltage characteristic made from the characteristics of the two piezoelectric elements;

FIGS. 4A to 4C are equivalent circuits of a pair of piezoelectric elements applied with forward/reverse bias voltage, in which FIG. 4A illustrates the normal product, FIG. 4B illustrates the P-NG waster, and FIG. 4C illustrates the P-NG waster;

FIG. 5 is a graph illustrating capacitance-voltage characteristics of the piezoelectric elements of FIGS. 4A to 4C with an initial state being zeroed;

FIGS. 22A to 22C are equivalent circuits each represented along with a capacitance value of a sample of a pair of piezoelectric elements, in which FIG. 22A is with a full wiring breakage, FIG. 22B is with a single wiring breakage, and FIG. 22C is without wiring breakage;

FIGS. 23A to 23C are views illustrating a head suspension with a pair of piezoelectric elements according to a related art, in which FIG. 23A is a plan view of the head suspension, FIG. 23B is an equivalent circuit of the piezoelectric elements, and FIG. 23C is a model illustrating deformation of the piezoelectric elements;

DETAILED DESCRIPTION OF EMBODIMENTS

Figure 2A:
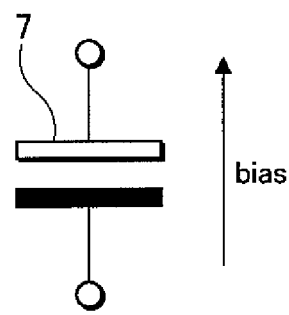
FIG. 2A illustrates an equivalent circuit of a piezoelectric element applied with forward bias voltage.

The present invention tests a fitted state of piezoelectric elements fitted to form an actuator according to a characteristic of changes in capacitance of the piezoelectric elements with respect to bias voltage that is changed within a predetermined range. In each embodiment, examples of the method tests a fitted state of a pair of piezoelectric elements fitted to form an actuator on a head suspension will be explained in detail with reference to the drawings.

FIGS. 1A to 1C are plan views illustrating a head suspension and piezoelectric elements fitted thereto. In FIG. 1A, the head suspension is a normal product to which the piezoelectric elements are correctly fitted. In FIG. 1B, the head suspension is a waster (P-NG waster) to which the piezoelectric elements are incorrectly fitted with each positive electrode being on top. In FIG. 1C, the head suspension is a waster (N-NG waster) to which the piezoelectric elements are incorrectly fitted with each negative electrode being on top.

The head suspension 1 has a base plate 3 as a base member, a load beam 5, and an actuator 9. The actuator 9 is formed by a pair of piezoelectric elements made of, for example, PZT (lead zirconate titanate) and arranged between the base plate 3 and the load beam 5. The piezoelectric elements are arranged side by side in opposite polarity.

Namely, if correctly arranged, one of the piezoelectric elements is arranged with its positive electrode being on top and negative electrode at the bottom and the other piezoelectric element is arranged with its negative electrode being on top and positive electrode at the bottom.

A front end of the load beam 5 supports a read/write head 11. The load beam 5 and head 11 form a movable member. That is, the piezoelectric elements are fitted to form the actuator 9 between the base plate 3 as the base member and the load beam 5 and head 11 as the movable member. The head 11 includes a slider 15 that is attached to a tongue of a flexure 13. The flexure 13 is fixed to the load beam 5 by, for example, laser spot welding.

In FIG. 1A, the head suspension 1 is the normal product including the piezoelectric elements 7a and 7b that are correctly arranged to form the actuator 9 in a normal state. This normal state is represented as a P-N-normal state. When viewed from the flexure 13 side with the base plate 3 being on the lower side as illustrated in FIG. 1A, the left piezoelectric element 7a has a positive electrode (depicted with a hatched square) on top and the right piezoelectric element 7b has a negative electrode (depicted with a blank square) on top. The flexure 13 includes a wire that is connected to the top electrodes of the piezoelectric elements 7a and 7b. On the opposite side, the bottom electrodes of the piezoelectric elements 7a and 7b are connected through, for example, a conductive adhesive to the base plate 3. Namely, the piezoelectric elements 7a and 7b are electrically connected in parallel with each other.

In the following explanation, the piezoelectric element having a positive electrode on top is represented as P-PZT and the piezoelectric element having a negative electrode on top as N-PZT.

When a voltage is applied, the P-PZT 7a and N-PZT 7b of the actuator 9 oppositely deform such that one of P-PZT 7a and N-PZT 7b expands and the other contracts depending on the applied voltage, thereby slightly moving the head 11 through the load beam 5 relative to the base plate 3 in a sway direction, i.e., a direction in which the P-PZT 7a and N-PZT 7b are arranged side by side.

In FIG. 1B, the head suspension 1A is the P-NG waster including the only P-PZTs 7a that are arranged in the actuator 9A in an error state. This error state is represented as a P-P-error state.

In FIG. 1C, the head suspension 1B is the N-NG waster including only N-PZTs 7b that are arranged in the actuator 9B in an error state. This error state is represented as a N-N-error state.

A method of testing a fitted state of piezoelectric elements fitted to form an actuator on a head suspension according to an embodiment of the present invention will be explained. The method tests the piezoelectric elements in the actuators 9, 9A, and 9B of the head suspensions 1, 1A, and 1B, to discriminate the normal product of FIG. 1A from the wasters of FIGS. 1B and 1C.

The method applies bias voltage that is changed in a predetermined range to the piezoelectric elements, detects changes in capacitance of the piezoelectric elements with respect to changes in the bias voltage within a predetermined range, and determines a state of the piezoelectric elements according to a characteristic of the changes in capacitance of the piezoelectric elements.

Figure 2B:
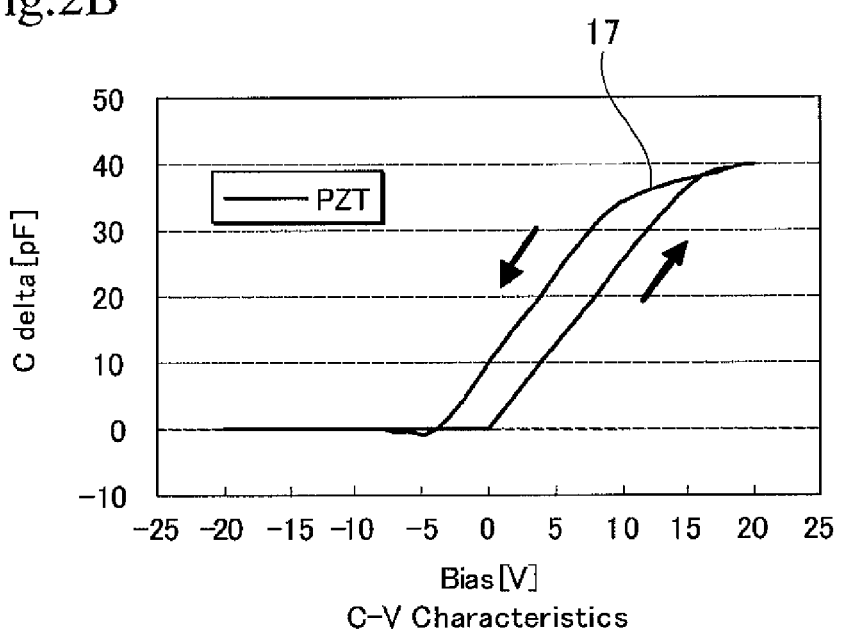
FIG. 2B is a graph illustrating a capacitance-voltage characteristic of the piezoelectric element of FIG. 2A with an initial state being zeroed.
Figure 3A:
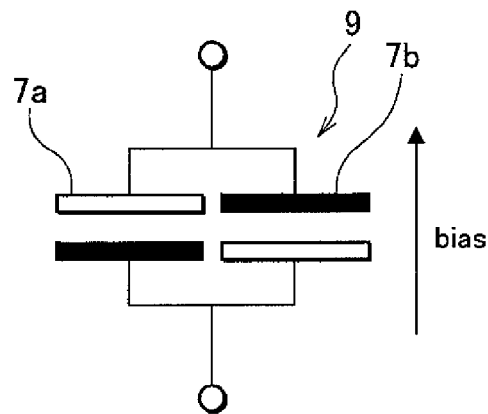
FIG. 3A illustrates an equivalent circuit of a pair of piezoelectric elements applied with forward/reverse bias voltage.

FIG. 2A illustrates an equivalent circuit of a piezoelectric element applied with forward bias voltage, FIG. 2B is a graph illustrating a capacitance-voltage characteristic of the piezoelectric element of FIG. 2A with an initial state being zeroed, FIG. 3A illustrates an equivalent circuit of a pair of piezoelectric elements applied with forward/reverse bias voltage, and FIG. 3B is a graph illustrating capacitance-voltage characteristics of the piezoelectric elements of FIG. 3A with an initial state being zeroed and a graph illustrating a combined capacitance-voltage characteristic made from the characteristics of the two piezoelectric elements.

When receiving forward bias voltage, the piezoelectric element 7 of FIG. 2A shows a capacitance-voltage characteristic 17 having a hysteresis as illustrated in FIG. 2B.

The equivalent circuit of FIG. 3A corresponds to the P-PZT 7a and N-PZT 7b arranged in the head suspension 1 of FIG. 1A. When receiving bias voltage, the P-PZT 7a shows a capacitance-voltage characteristic 19 and the N-PZT 7b a capacitance-voltage characteristic 21 having a hysteresis illustrated in the upper graph of FIG. 3B. Combining the capacitance-voltage characteristics 19 and 21, the characteristics 19 and 21 form a capacitance-voltage characteristic 23 that is substantially left-right symmetrical and has a V-shape as illustrated in the lower graph of FIG. 3B.

FIGS. 4A to 4C are equivalent circuits of a pair of piezoelectric elements applied with forward/reverse bias voltage. FIG. 4A corresponds to FIG. 1A of the normal product. FIG. 4B corresponds to FIG. 1B of the P-NG waster. FIG. 4C corresponds to FIG. 1C of the N-NG waster. FIG. 5 is a graph illustrating capacitance-voltage characteristics of the piezoelectric elements of FIGS. 4A to 4C with an initial state being zeroed.

In FIGS. 4A to 4C and the other drawings, "OK" indicates the normal product, "P-NG" indicates the P-NG waster, and "N-NG" indicates the N-NG waster.

When bias voltage is applied, the normal product of FIG. 4A shows a capacitance-voltage characteristic 27 of FIG. 5, the P-NG waster of FIG. 4B a capacitance-voltage characteristic 29 of FIG. 5, and the N-NG waster of FIG. 4C a capacitance-voltage characteristic 31 of FIG. 5.

A maximum value of the range in which the bias voltage applied to the piezoelectric elements is changed is a maximum reverse bias voltage that is 20% of a maximum driving voltage that generates an external pressure to completely suppress expansion of the piezoelectric elements.

A minimum value of the range in which the bias voltage applied to the piezoelectric elements is changed is set so that changes in capacitance to be detected may exceed measurement fluctuations or variations.

Figure 6:
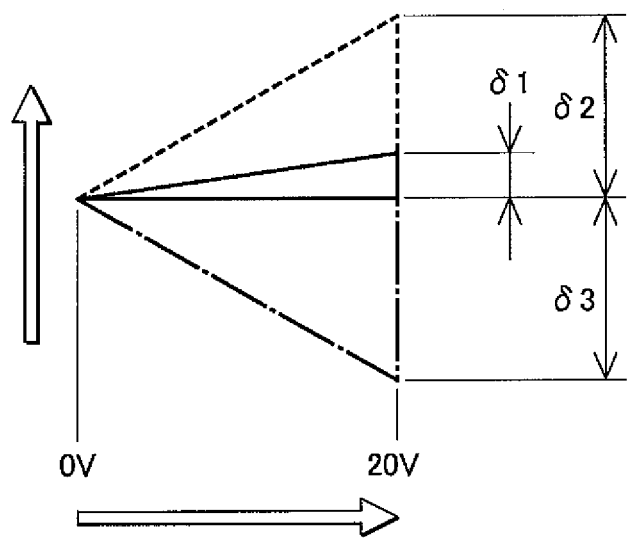
FIG. 6 is a graph simply illustrating capacitance changes with respect to bias voltages in the range of 0 V to 20 V according to a testing principle of an embodiment of the present invention.
Figure 7:
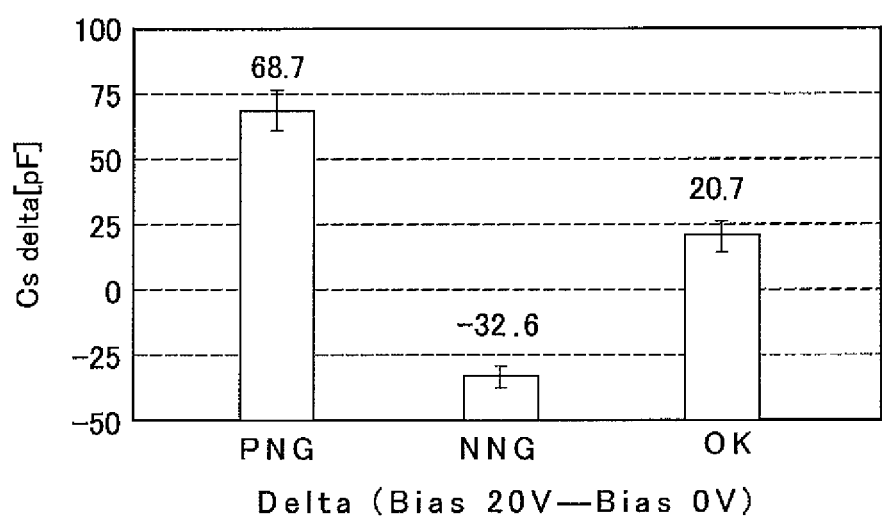
FIG. 7 is a graph illustrating capacitance values with respect to two conditions of bias voltages of 20 V and 0 V.
Figure 8:
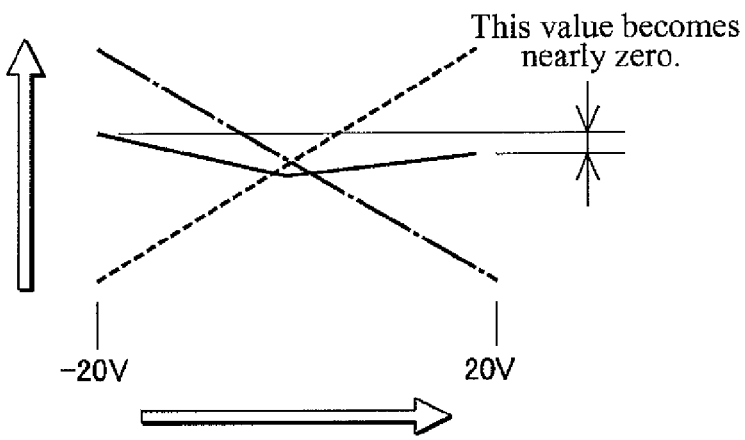
FIG. 8 is a graph simply illustrating capacitance changes with respect to bias voltages in the range of 20 V to −20 V according to a testing principle of an embodiment of the present invention.
Figure 9:
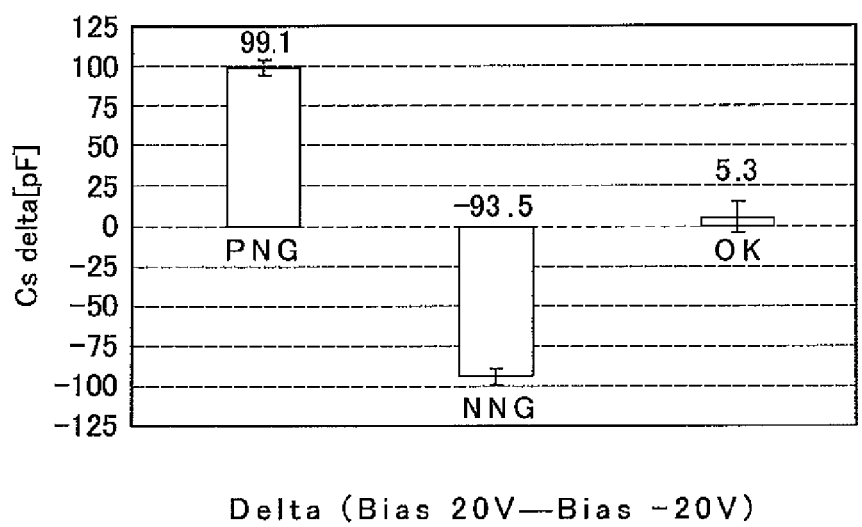
FIG. 9 is a graph illustrating capacitance values with respect to two conditions of bias voltages of 20 V and −20 V.

FIG. 6 is a graph simply illustrating capacitance changes of samples of the piezoelectric elements of FIGS. 4A to 4C with respect to bias voltages in the range of 0 V to 20 V according to a testing principle of an embodiment of the present invention, FIG. 7 is a graph illustrating capacitance values of samples of the piezoelectric elements of FIGS. 4A to 4C with respect to two conditions of bias voltages of 20 V and 0 V, FIG. 8 is a graph simply illustrating capacitance changes of samples of the piezoelectric elements of FIGS. 4A to 4C with respect to bias voltages in the range of 20 V to −20 V according to a testing principle of an embodiment of the present invention, and FIG. 9 is a graph illustrating capacitance values of samples of the piezoelectric elements of FIGS. 4A to 4C with respect to two conditions of bias voltages of 20 V and −20 V.

The testing principle of FIGS. 6 and 7 determines a fitted state of piezoelectric elements according to whether changes in capacitance (capacitance changes) of the piezoelectric elements are within a given range. The testing principle of FIGS. 8 and 9 determines a fitted state of piezoelectric elements according to whether capacitance changes of the piezoelectric elements similarly appear with respect to positive and negative bias voltages having the same absolute value. Namely, the determining a fitted state of piezoelectric elements of FIGS. 8 and 9 checks to see if the characteristic of the detected capacitance changes indicates that a change in capacitance with respect to a positive bias voltage corresponds to a change in capacitance with respect to a negative bias voltage that has the same absolute value as the positive bias voltage. Each testing principle determines whether or not the P-PZT 7a and N-PZT 7b are correctly arranged and connected in parallel with each other.

In FIGS. 6 and 7, a capacitance difference δ1 of the normal product with the piezoelectric elements of the P-N-normal state (FIG. 4A) with respect to two conditions of bias voltages of 20 V and 0 V is 20.7, a capacitance difference δ2 of the P-NG waster product with the piezoelectric elements of the P-P-error state (FIG. 4B) is 68.7, and a capacitance difference δ3 of the N-NG waster with the piezoelectric elements of the N-N-error state (FIG. 4C) is −32.6. Accordingly, it is possible to distinguish the P-NG waster and N-NG waster with the P-P and N-N-error state, respectively from the normal product by comparing a detected capacitance difference with the normal capacitance difference δ1 of 20.7.

In FIGS. 8 and 9, a capacitance difference of piezoelectric elements with respect to two conditions of bias voltages of 20 V and −20 V is clearly observed. The testing principle of FIGS. 8 and 9 checks to see if capacitance values of piezoelectric elements with respect to positive and negative bias voltages having the same absolute value correspond to each other.

With respect to the bias voltages of 20 V and −20 V, the piezoelectric elements of the normal product with the P-N-normal state show a capacitance difference δ1 of 5.3, the piezoelectric elements of the P-NG waster with the P-P-error state show a capacitance difference δ2 of 99.1, and the piezoelectric elements of the N-NG waster with the N-N-error state show a capacitance difference δ3 of −93.5. The capacitance difference of the piezoelectric elements of the P-N-normal state is nearly zero. Namely, the piezoelectric elements of the P-N-normal state show nearly the same capacitance value with respect to positive and negative bias voltages (20 V and −20 V) having the same absolute value. On the other hand, the piezoelectric elements of the P-P-error or N-N-error state show quite different capacitance values with respect to the positive and negative bias voltages having the same absolute value.

Figure 10:
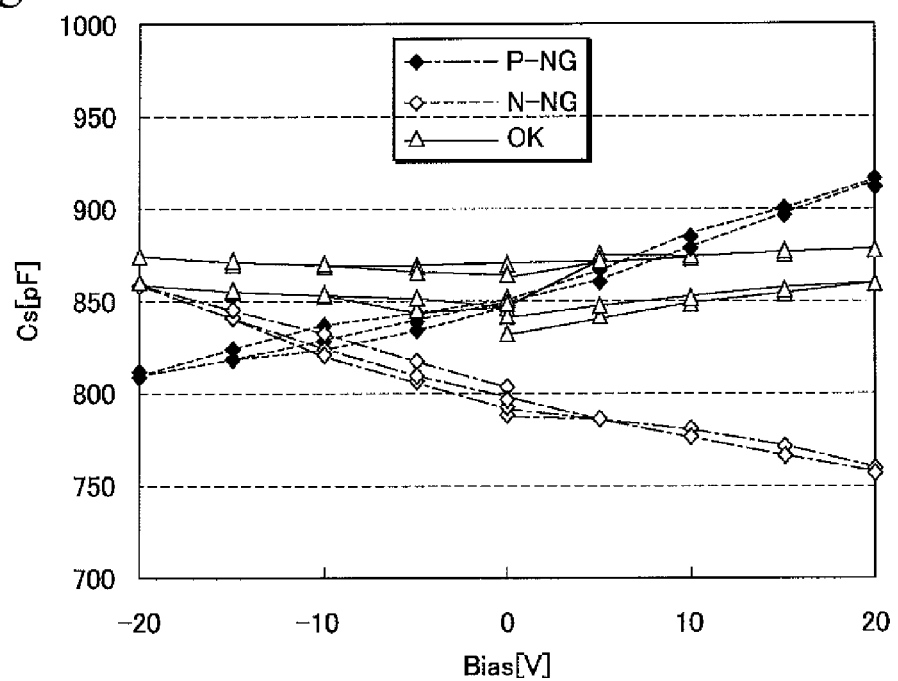
FIG. 10 is a graph illustrating capacitance changes indicated with capacitance values with respect to bias voltages in the range of 20 V to −20 V.
Figure 11:
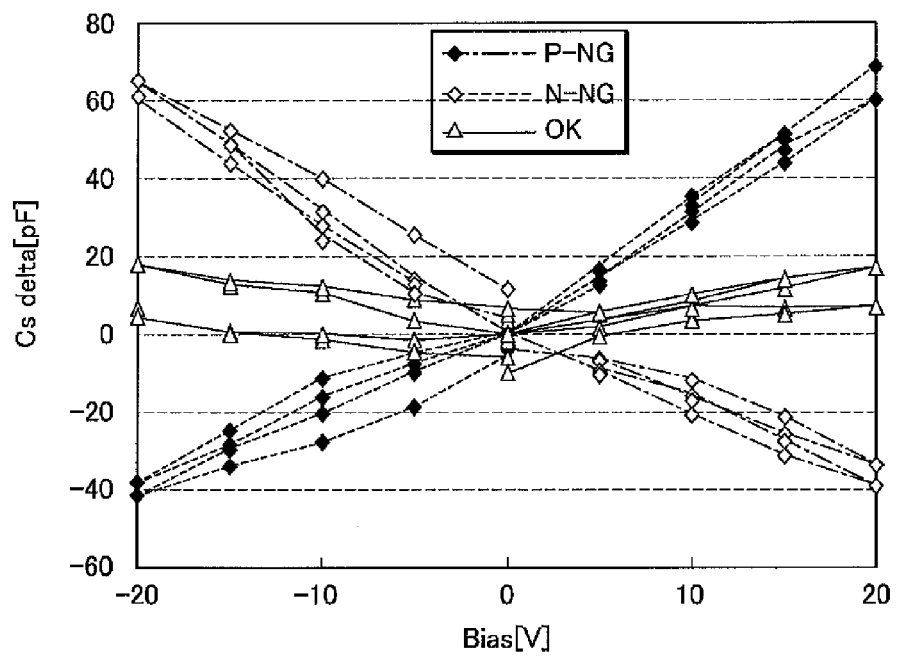
FIG. 11 is a graph standardized from the graph of FIG. 10 according to a capacitance of zero and a bias voltage of zero.

FIG. 10 is a graph illustrating capacitance changes indicated with capacitance values of samples of the piezoelectric elements of FIGS. 4A to 4C with respect to bias voltages in the range of 20 V to −20 V and FIG. 11 is a graph standardized from the graph of FIG. 10 according to a capacitance of zero and a bias voltage of zero.

Capacitance values of FIG. 10 are measured by applying bias voltages in the range of 20 V to −20 V to samples of the actuators 9, 9A, and 9B of FIGS. 1A, 1B, and 1C (corresponding to the actuators 9, 9A, and 9B of FIGS. 4A, 4B, and 4C). The graph of FIG. 11 is obtained by standardizing the data of FIG. 10 according to a capacitance value of 0 and a bias voltage of 0 as changes. The graph of FIG. 11 is usable to easily distinguish the normal product from the P-NG waster and N-NG waster.

Figures 12, 13:
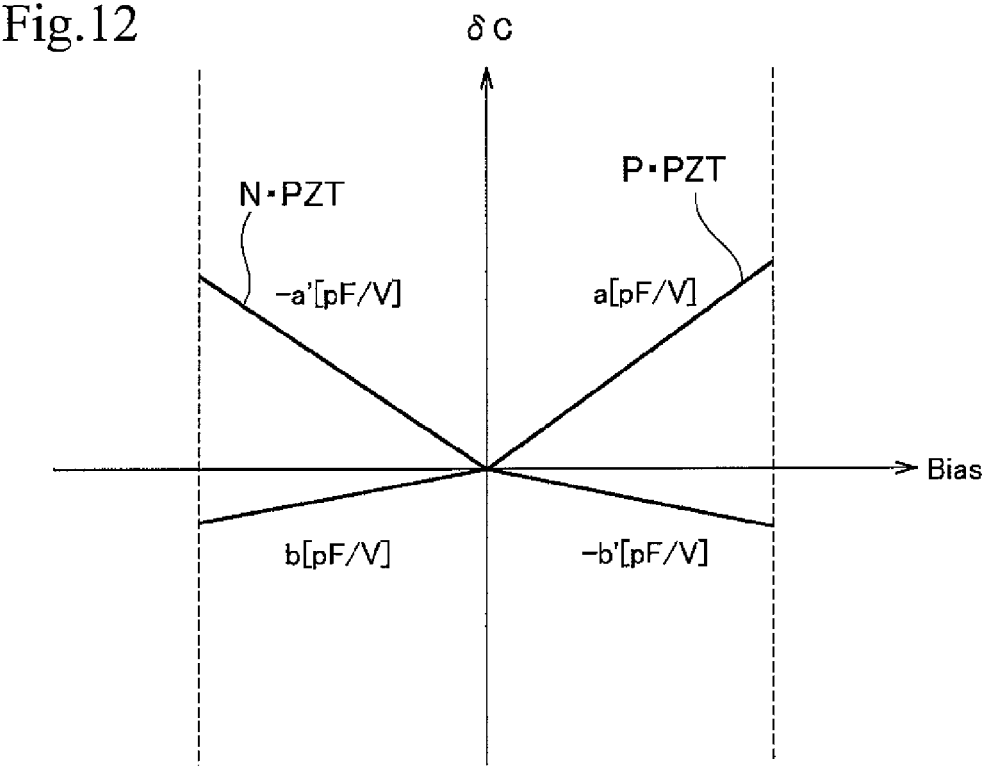
FIG. 12 is a graph illustrating voltage sensitivities according to a testing principle based on an embodiment of the present invention.
FIG. 13 is a table for distinguishing piezoelectric elements according to the testing principle of FIG. 12.
Figure 14:
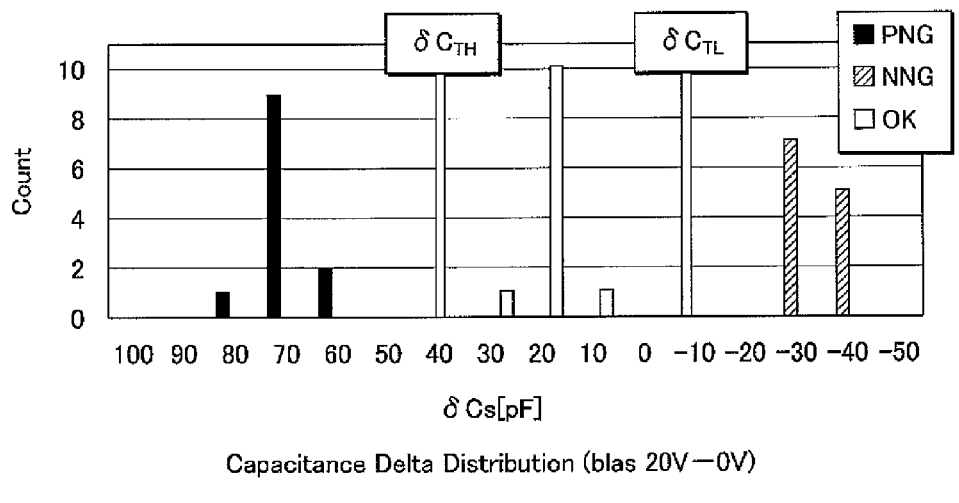
FIGS. 14 and 15 are graphs each illustrating a distribution of capacitance values as well as threshold values according to the testing principle of FIG. 12.
Figure 15:
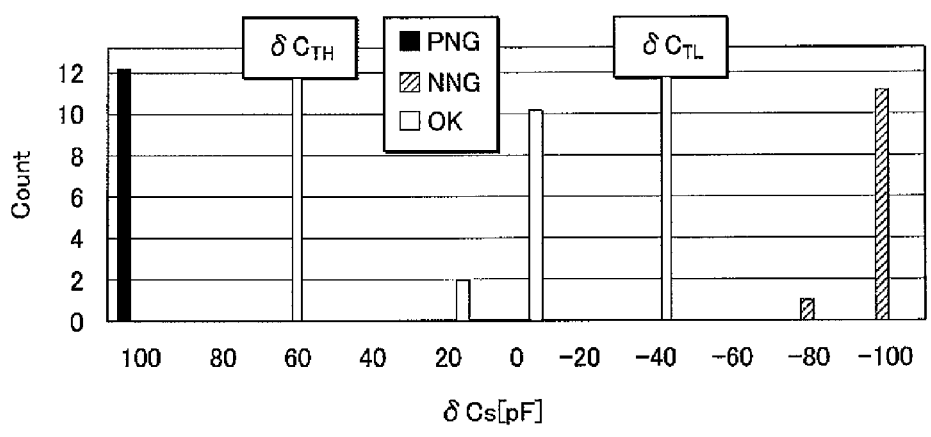

FIG. 12 is a graph illustrating voltage sensitivities of samples of the piezoelectric elements of FIGS. 4A to 4C according to a testing principle based on an embodiment of the present invention, FIG. 13 is a table for distinguishing piezoelectric elements, FIG. 14 is a graph illustrating a distribution of capacitance values of samples of the piezoelectric elements of FIGS. 4A to 4C with respect to two conditions of bias voltages of 20 V and 0 V as well as threshold values according to the testing principle of FIG. 12, and FIG. 15 is a graph illustrating a distribution of capacitance values of samples of the piezoelectric elements of FIGS. 4A to 4C with respect to two conditions of bias voltages of 20 V and −20 V as well as threshold values according to the testing principle of FIG. 12.

The piezoelectric elements are also testable in such a way that the determining a fitted state of the piezoelectric elements checks to see if the characteristic of the detected capacitance changes indicates that the detected capacitance changes are within a range of threshold values.

In FIG. 12, "a" is a voltage sensitivity of the capacitance of a P-PZT with respect to a positive bias voltage, "b" is a voltage sensitivity of the capacitance of the P-PZT with respect to a negative bias voltage, "a'" is a voltage sensitivity of the capacitance of an N-PZT with respect to the positive bias voltage, and "b'" is a voltage sensitivity of the capacitance of the N-PZT with respect to the negative bias voltage.

In FIG. 13, a capacitance difference $\delta Cok(V)$ of the normal product with the P-N-normal state with respect to a bias voltage of V is expressed as follows:

$$\delta Cok(V)=(a-b')V$$

Similarly, a capacitance difference $\delta Cpng(V)$ of the P-NG waster with the P-P-error state with respect to the bias voltage V is expressed as follows:

$$\delta Cpng(V)=2aV$$

The difference between the capacitance values of the normal product and P-NG waster is as follows:

$$\delta Cpng(V)-\delta Cok(V)=2aV-(a-b')V=(a+b')V$$

The bias voltage V is set so that the difference "(a+b')V" has a significant value with respect to capacitance measurement fluctuations.

If the capacitance measurement fluctuations are in the range of "d", a capacitance difference variation range with respect to the two conditions of two bias voltages will be "2d". Accordingly, the voltage V to be used for finding the P-NG waster is as follows:

$$(a+b')V>>2d$$

$$V>>2d/(a+b')$$

Similarly, the voltage V to be used for finding the N-NG waster is as follows:

$$V>>2d/(a'+b)$$

P-PZT and N-PZT that form an actuator of a head suspension generally satisfy "a=a'" and "b=b'", and therefore, the voltage V to be used for testing the piezoelectric elements is as follows:

$$V>>2d/(a+b)$$

Namely, it is found that the bias voltage V used for testing an actuator must sufficiently be larger than a value obtained by doubling the capacitance measurement fluctuation range and by dividing the doubled result by the sum of capacitance-voltage inclinations in a positive bias voltage range and a negative bias voltage range.

According to the tests on the sample P-NG waster and sample N-NG waster, the following values are obtained:

$$a=1.6[pF/V]$$

$$b'=0.9[pF/V]$$

If d is 10 [pF], the voltage V must be:

$$V>>8\ [V]$$

Capacitance differences $\delta Cok$ of the normal product, $\delta Cpng$ of the P-NG waster, and $\delta Cnng$ of the N-NG waster between a capacitance value at a bias voltage of 0 V and a capacitance value at a bias voltage of V (or −V) have the following relationship because a>b and a'>b':

$$\delta Cpng>\delta Cok>\delta Cnng$$

According to a distribution research of samples, the normal product and the wasters are actually distinguishable from each other with a narrower range of threshold values depending on capacitance measurement accuracy and bias voltages. In substance, intermediate value of the capacitance differences $\delta Cok$ and $\delta Cpng$ and intermediate value of the capacitance differences $\delta Cok$ and $\delta Cnng$ are available as threshold values to test piezoelectric elements.

An upper limit $\delta Cth$ and a lower limit $\delta Ctl$ of a range of capacitance differences to determine a normal product with respect to bias voltages of V and 0 are as follows:

$$\delta Cth=(\delta Cpng(V)+\delta Cok(V))/2=(3a-b')V/2$$

$$\delta Ctl=(\delta Cok(V)+\delta Cnng(V))/2=(a-3b')V/2$$

With the use of the above-mentioned values obtained from the tests carried out on the samples, the following values are obtained with respect to the bias voltage V=20 [V]:

$$\delta Cth=40\ pF$$

$$\delta Ctl=-10\ pF$$

With these threshold values, a normal product and wasters are distinguished from each other as illustrated in FIG. 14.

Since the number of the samples used to measure "a" and "b" is small, the threshold values are slightly shifted toward a negative side.

Upper limit $\delta Cth$ and lower limit $\delta Ctl$ of capacitance difference for finding a normal product with the use of bias voltages of V and −V will be explained.

Generally, "a" is nearly equal to "a'" and "b" is nearly equal to "b'", and therefore, δCok(V) is nearly equal to δCok(−V). Accordingly, the threshold values will be as follows:

$$\delta Cth = (\delta Cpng(V) - \delta Cpng(-V))/2 = (a+b)V$$

$$\delta Ctl = (\delta Cnng(V) - \delta Cnng(-V))/2 = -(a'+b')V$$

With the use of the values obtained from the sample tests, the following values are obtained:

$$\delta Cth = 52 \text{ pF}$$

$$\delta Ctl = -47.8 \text{ pF}$$

With these threshold values, a normal product and wasters are distinguished from each other as illustrated in FIG. 15.

As the difference between two bias voltages used for a test increases, a capacitance difference widens to improve an accuracy of the test.

Figure 16:
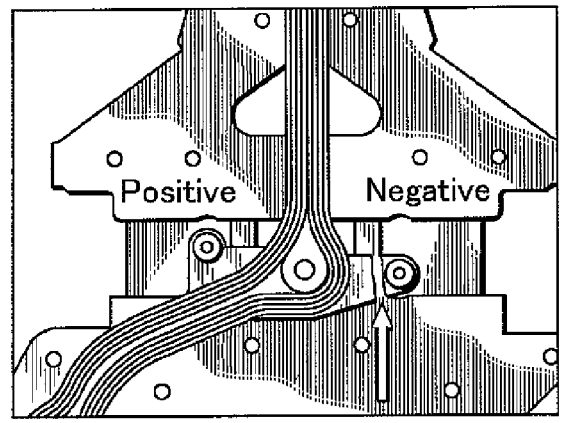
FIGS. 16 to 19 are partial plan views illustrating examples of breakage in wiring connected to piezoelectric elements.
Figure 17:
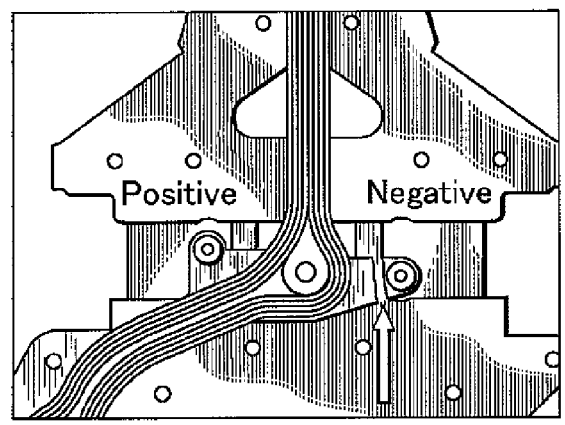
Figure 18:
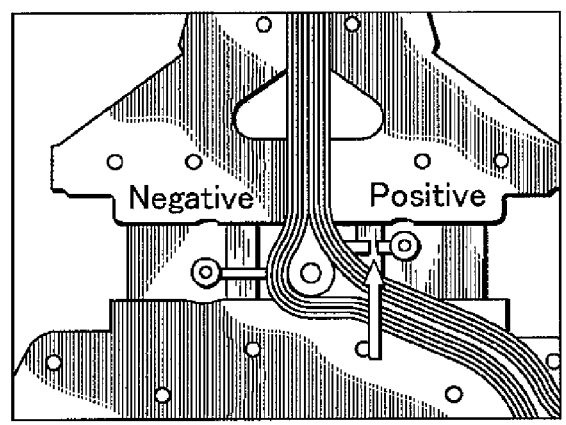
Figure 19:
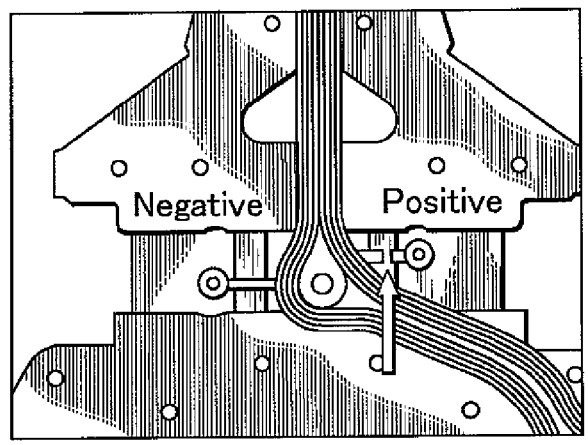
Figure 20:
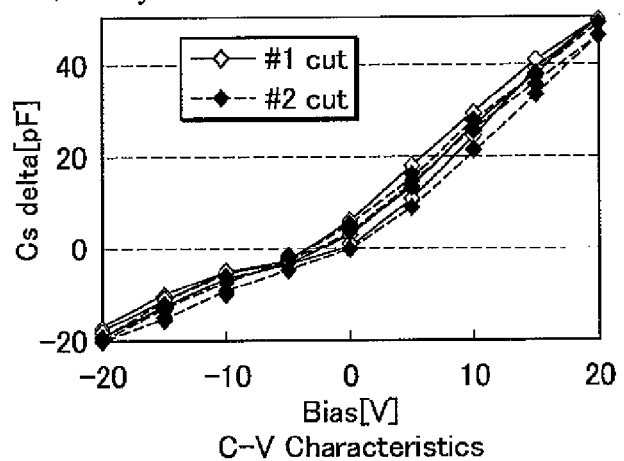
FIG. 20 is a graph illustrating capacitance-voltage characteristics measured on samples of the piezoelectric elements of FIGS. 16 and 17.
Figure 21:
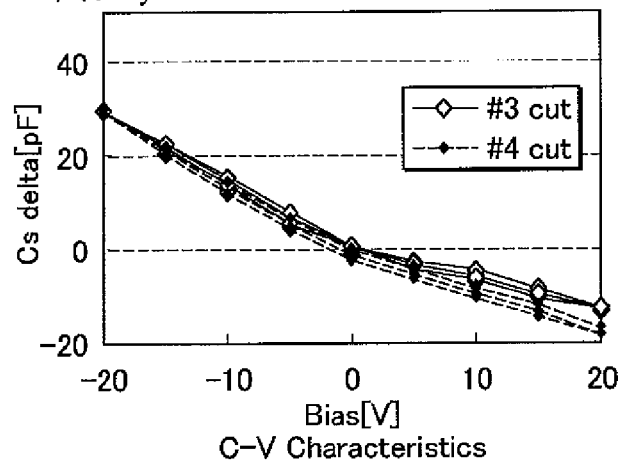
FIG. 21 is a graph illustrating capacitance-voltage characteristics measured on samples of the piezoelectric elements of FIGS. 18 and 19.

FIGS. 16 to 19 are partial plan views illustrating examples of breakage in wiring connected to piezoelectric elements, FIG. 20 is a graph illustrating capacitance-voltage characteristics measured on samples of the piezoelectric elements of FIGS. 16 and 17, and FIG. 21 is a graph illustrating capacitance-voltage characteristics measured on samples of the piezoelectric elements of FIGS. 18 and 19.

In FIGS. 16 to 19, each actuator has a wiring breakage at a location indicated with an arrow. When a bias voltage is applied to the actuator of any one of FIGS. 16 and 17, only a left piezoelectric element P-PZT is energized. Similarly, when a bias voltage is applied to the actuator of any one of FIGS. 18 and 19, only a right piezoelectric element N-PZT is energized.

Capacitance-voltage characteristics of samples of FIGS. 16 and 17 are obtained as illustrated in FIG. 20 and capacitance-voltage characteristics of samples of the actuators of FIGS. 18 and 19 are obtained as illustrated in FIG. 21.

Comparing the capacitance-voltage characteristic of a given product or head suspension, such as one of those illustrated in FIGS. 20 and 21, with the capacitance-voltage characteristic of a normal product allows to determine whether or not the given head suspension has a wiring breakage. Thus, the determining a fitted state of the piezoelectric elements determines if the piezoelectric elements involve a breakage in a circuit through which the piezoelectric elements receive voltage.

A connection failure in wiring to supply power to an actuator having two piezoelectric elements and a mode of the connection failure will be determined by finding a capacitance difference δC of the actuator with respect to two conditions of bias voltages and a capacitance value of the actuator with respect to one of the two bias voltages. This will be explained in more detail.

Figure 22A:
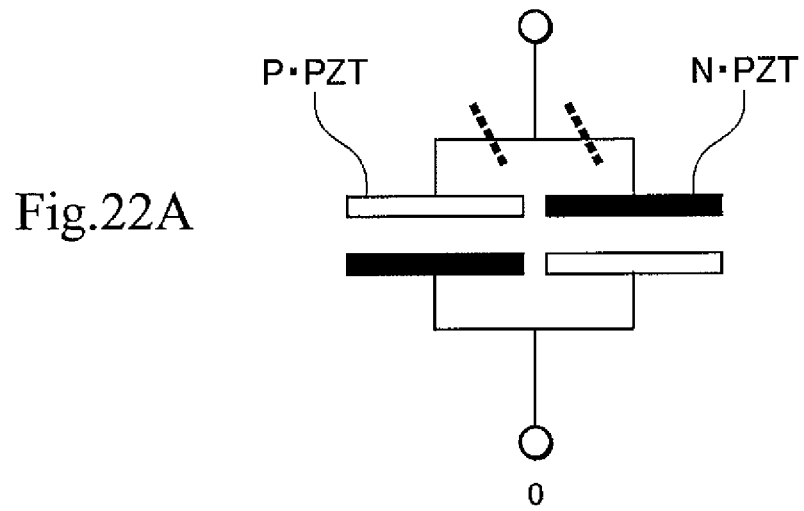
Figure 22B:
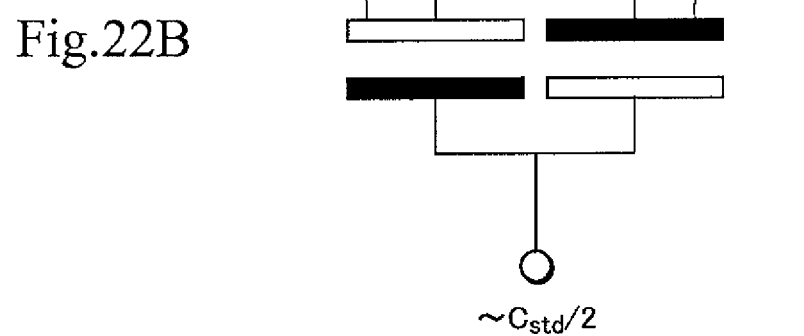
Figure 22C:
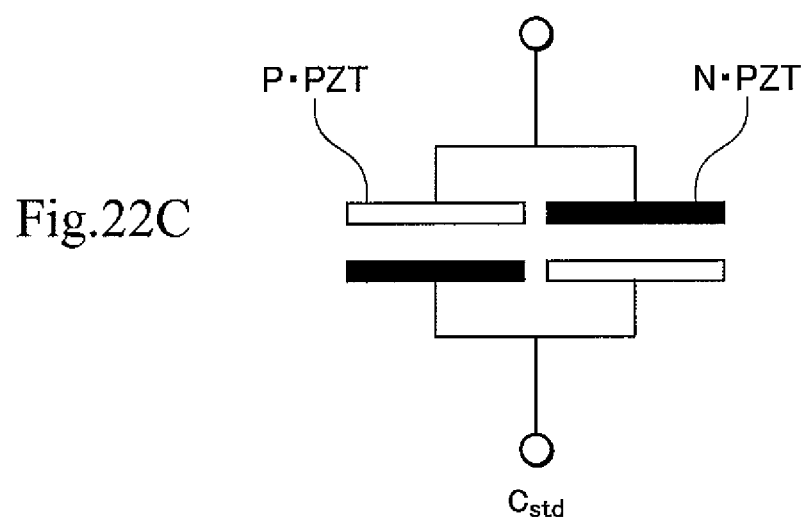
Figure 23A:
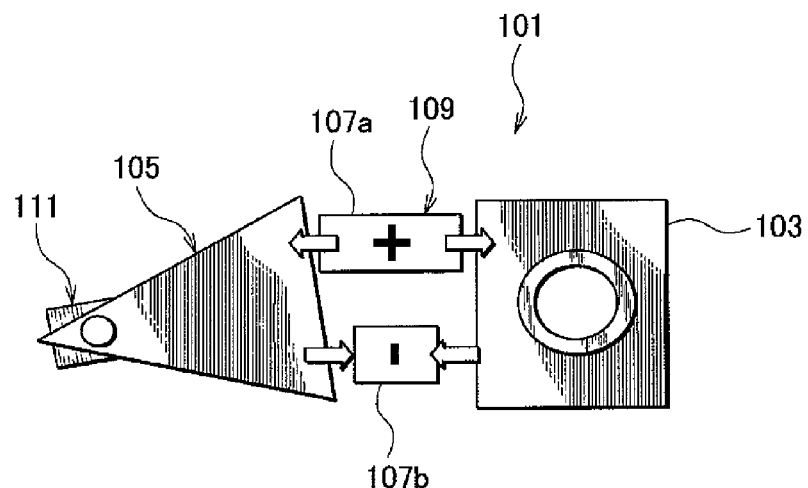
Figure 23B:
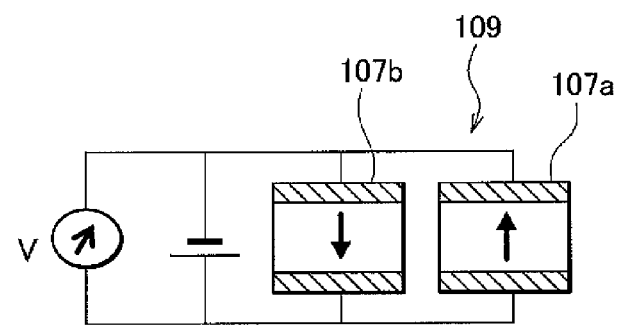
Figure 23C:
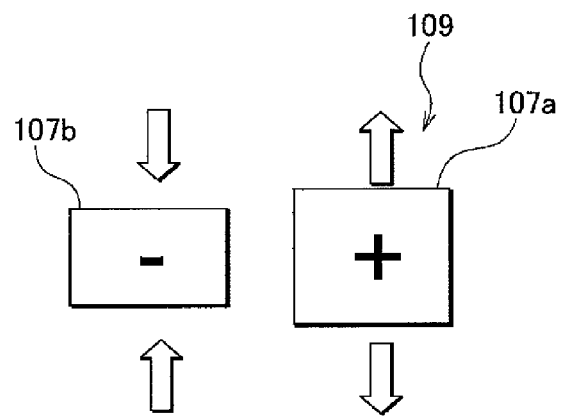
Figure 24A:
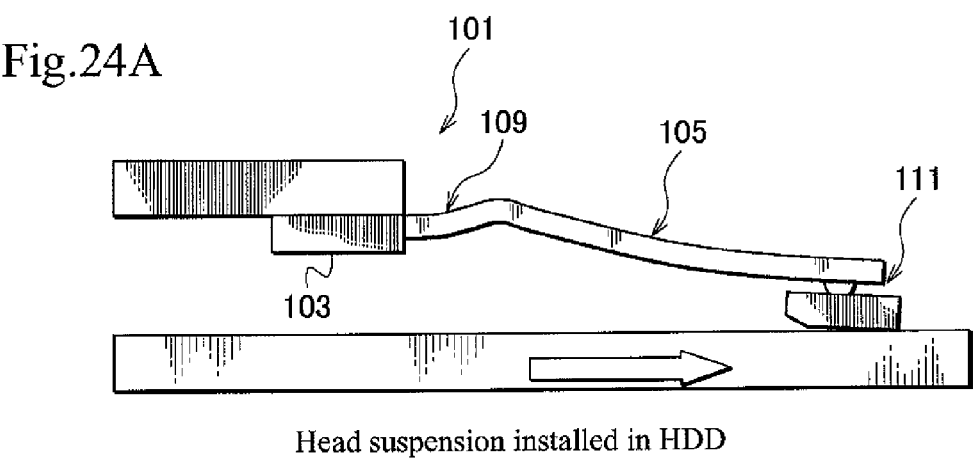
FIG. 24A illustrates the head suspension of FIG. 23A on a disk in a hard disk drive.
Figure 24B:
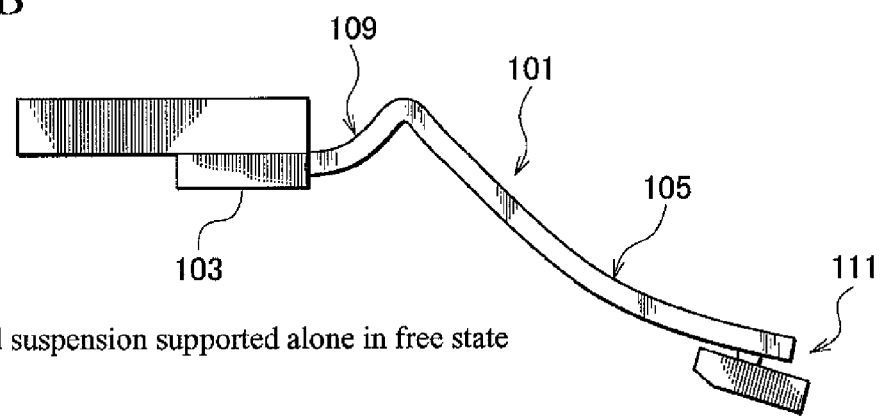
FIG. 24B illustrates the head suspension of FIG. 23A supported alone in a free state.

FIGS. 22A to 22C are equivalent circuits each represented along with a capacitance value of a sample of a pair of piezoelectric elements, in which FIG. 22A is with a full wiring breakage, FIG. 22B is with a single wiring breakage (half breakage), and FIG. 22C is without wiring breakage.

Generally, the capacitance of a P-PZT is substantially equal to that of an N-PZT. The normal product without wiring breakage of FIG. 22C has a standard capacitance value of Cstd, the waster with full wiring breakage of FIG. 22A has a capacitance value of 0, and the waster with single wiring breakage has a capacitance value of "Cstd/2".

A given head suspension shows a capacitance value C(V) with respect to a bias voltage V. If C(V)<Cstd/4, the head suspension is determined to have a full wiring breakage, i.e., a pair of piezoelectric elements of the actuator each have a connection failure. If Cstd/4<C(V)<Cstd×¾, the head suspension is determined to have a single wiring breakage, i.e., one of the piezoelectric elements of the head suspension has a connection failure. If C(V)>Cstd×¾, the head suspension is determined to be normal.

If it is determined that one of the piezoelectric elements of a given head suspension has a wiring breakage, which of the piezoelectric elements has the failure is determined by measuring a capacitance difference δC with respect to two conditions of two bias voltages.

With two conditions of bias voltages of V and 0, a wiring breakage of a P-PZT is found as follows:

$$\delta Cpcut = Cpcut(V) - Cpcut(0) = -b'V$$

where "pcut" indicates the P-PZT having a wiring breakage.

Similarly, a wiring breakage of an N-PZT is found as follows:

$$\delta Cncut = Cncut(V) - Cncut(0) = aV$$

where "ncut" indicates the N-PZT having a wiring breakage.

By comparing a given capacitance difference δC with an intermediate value of δCpcut and δCncut, it is possible to find out which of the piezoelectric elements of a given product or head suspension has a wiring breakage. Namely, if δC>(a−b')V/2, the N-PZT has a wiring breakage, and if δC<(a−b')V/2, the P-PZT has a wiring breakage.

With bias voltages of V and −V, a wiring breakage of a P-PZT is found as follows:

$$\delta Cpcut = Cpcut(V) - Cpcut(-V) = -(a'+b')V$$

Similarly, a breakage of an N-PZT is found as follows:

$$\delta Cncut = Cncut(V) - Cncut(-V) = (a'+b')V$$

Generally, "a" is nearly equal to "a'" and "b" is nearly equal to "b'", and therefore, an intermediate value of δCpcut and δCncut is 0. Accordingly, if δC>0, it is determined that the P-PZT of a given head suspension has a wiring breakage, and if δC<0, it is determined that the N-PZT of a given head suspension has a wiring breakage.

There is a possibility that a single wiring breakage and an arrangement failure simultaneously occur in a given product or head suspension. Accordingly, perfectly identifying a failure mode needs a combination of determining a fitted state of the piezoelectric elements of the given head suspension and testing the conductivity of the PZTs with respect to a tail pad. Namely, if a head suspension is determined to have one of the P-P-error and N-N-error state, a conductivity test must be carried out between the electrodes of the piezoelectric elements of the head suspension and wiring tail pads, to determine if there is a wiring breakage.

The method of testing a fitted state of piezoelectric elements fitted to an object according to the present invention is applicable not only to actuators of head suspensions but also to actuators of other devices if the actuators have each a pair of piezoelectric elements that are arranged side by side in opposite polarity.

Two conditions of bias voltage values V1 and V2 used for the method of the present invention are not limited to V1(=given value) and V2(=0 V), or V1(=given value) and V2(=−V1). The bias voltages V1 and V2 may take any values if they are within 20% of a maximum driving voltage and have an identifiable voltage difference. For example, the bias voltages V1 and V2 may be −5 V and +15 V in the samples of the specification.

What is claimed is:

1. A method of testing a fitted state of a pair of piezoelectric elements fitted to form an actuator between a base member and a movable member, the piezoelectric elements being arranged side by side in opposite polarity and being electrically connected in parallel with each other, and when a voltage is applied to the piezoelectric elements, minutely moving the movable member relative to the base member in a direction in which the piezoelectric members are arranged side by side, the method comprising steps of:

- detecting changes in capacitance of the piezoelectric elements with respect to changes in bias voltage applied to the piezoelectric elements, the bias voltage being changed within a predetermined range; and
- determining a fitted state of the piezoelectric elements according to a characteristic of the detected capacitance changes.

2. The method of claim 1, wherein the determining step checks to see if the characteristic of the detected capacitance changes indicates that a change in capacitance with respect to a positive bias voltage corresponds to a change in capacitance with respect to a negative bias voltage that has the same absolute value as the positive bias voltage.

3. The method of claim 1, wherein the determining step checks to see if the characteristic of the detected capacitance changes indicates that the detected capacitance changes are within a range of threshold values.

4. The method of claim 1, wherein the detected capacitance changes are standardized according to a capacitance value of zero and a bias voltage of zero.

5. The method of claim 1, wherein a maximum value of the predetermined range of the bias voltage is a maximum reverse bias voltage that is 20% of a maximum driving voltage to completely suppress expansion of the piezoelectric elements.

6. The method of claim 1, wherein a minimum value of the predetermined range of the bias voltage is set so that any of the detected capacitance changes exceeds measurement fluctuations.

7. The method of claim 1, wherein the determining step determines whether or not the piezoelectric elements are correctly arranged.

8. The method of claim 1, wherein the determining step determines if the piezoelectric elements involve a breakage in a circuit through which the piezoelectric elements receive voltage.

9. The method of claim 1, wherein the base member is a base plate of a head suspension and a movable member is a read/write head supported with a load beam that is attached to the base plate.

10. A head suspension tested according to the method of claim 1, comprising:

- a base plate that serves as the base member; and
- a read/write head that serves as the movable member and is supported with a load beam that is attached to the base plate.

* * * * *